(12) United States Patent
Hoefer et al.

(10) Patent No.: US 6,881,813 B2
(45) Date of Patent: Apr. 19, 2005

(54) EPOXY RESIN HARDENER COMPOSITIONS

(75) Inventors: Rainer Hoefer, Duesseldorf (DE); Ulrich Nagorny, Hilden (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 0 days.

(21) Appl. No.: 10/338,443

(22) Filed: Jan. 8, 2003

(65) Prior Publication Data

US 2003/0149220 A1 Aug. 7, 2003

Related U.S. Application Data

(63) Continuation of application No. 09/503,583, filed on Feb. 14, 2000, now abandoned.

(30) Foreign Application Priority Data

Jun. 11, 1999 (DE) .......................... 199 26 629

(51) Int. Cl.[7] ........................ C08G 59/40; C08G 65/10; C08G 59/68
(52) U.S. Cl. ........................ 528/109; 528/92; 528/374; 252/182.17; 523/455; 523/456; 525/523
(58) Field of Search .......................... 528/92, 109, 374; 523/414, 455, 456; 525/525, 523; 252/182.17

(56) References Cited

U.S. PATENT DOCUMENTS 3,291,776 A * 12/1966 Newey et al. ............... 528/109
4,136,086 A * 1/1979 Baumann et al. ............ 528/99

FOREIGN PATENT DOCUMENTS

EP 0 742 259 A1 * 11/1996

OTHER PUBLICATIONS

Stuart J. Hartman, et al., "Mercaptans: An Added Dimension For Epoxy Coatings", Western Coatings Societies' Symposium and Show, Monterey, California, Feb. 23, 1987, pp. 1–24.
Leonard J. Calbo (Ed.), Handbook of Coating Additives, vol. 2, Marcel Dekker, New York, (1992), pp. 277–299.
Römpp, Lexikon, Lacke und Druckfarben, Georg Thieme Verlag, Stuttgart, New York, (1998), p. 375.
Zeno W. Wicks, Jr., et al., "Organic Coatings: Science and Technology", vol. 1, John Wiley & Sons, Inc., New York, (1992), pp. 162–179.
Dieter Stoye, et al. (Eds.), "Lackharze—Chemie, Eigenschaften und Anwendungen", Munich, (1996), pp. 252–263.
H. Kittel, Lehrbuch der Lacke und Beschichtungen, vol. 2, Stuttgart, (1998), pp. 267–291.
DIN 67 530, (Jan., 1982), pp. 278–282.

* cited by examiner

Primary Examiner—Daniel S. Metzmaier
(74) Attorney, Agent, or Firm—Aaron R. Ettelman

(57) ABSTRACT

The invention relates to epoxy resin hardener compositions containing at least one mercaptan hardener and at least one metal salt of $C_{8-24}$ carboxylic acids. These hardeners are distinguished in particular by the fact that catalyzed resins containing epoxy resins and the hardener compositions according to the invention give high-gloss molding compounds, more particularly coatings, after hardening by crosslinking.

20 Claims, No Drawings

EPOXY RESIN HARDENER COMPOSITIONS

CROSS-REFERENCE TO RELATED APPLICATIONS

This application claims priority under 35 U.S.C. §120, and is a continuation of, U.S. patent application Ser. No. 09/503,583, filed Feb. 14, 2000 (now abandoned), the entire contents of which are herein incorporated by reference.

BACKGROUND OF THE INVENTION

Film formers, now often referred to with a lack of definition as binders, are among the most important raw materials of paints. Film formers are generally organic polymers or prepolymers, the prepolymers, e.g., oligomers, being polymerized by so-called paint hardening. The function of film formers is to form a coherent paint or lacquer film adhering to the particular substrate and, at the same time, to hold together or encapsulate the other non-volatile constituents of the paint, more particularly pigments and fillers, where they are present. Accordingly, film formers represent the basis of a coating material. Film formers are divided according to origin into natural materials, modified natural materials and synthetic materials. Synthetic film formers include in particular polyesters, alkyd resins, acrylic resins, polymer dispersions, (e.g., emulsion polymers), formaldehyde condensates, polyurethanes and epoxy systems.

Natural film formers are relatively unimportant today. Besides natural resins, such as rosin, copal, dammar and shellac, the oxidatively drying oils above all are important. These are fatty oils, i.e. triglycerides of fatty acids, in which the number of double bonds is the most important feature from the point of view of paint technology. Of paramount importance is the so-called "drying" of these oils which is understood to take place by oxidative polymerization and crosslinking. Since the drying process is very slow, it is accelerated by the addition of so-called siccatives (i.e., drying agents) which are soaps, i.e. for example cobalt, manganese, zirconium, cerium salts of carboxylic acids. However, the crosslinking of drying oils by siccatives to form a so-called varnish is something entirely different from the crosslinking of epoxy resins described in the following.

Epoxy resins are organic substances or mixtures of organic substances which generally contain two or more (mostly isolated, generally terminal) epoxy groups per molecule and which can be crosslinked by reaction of those epoxy groups to form thermoset molding compositions. In the English-language literature, substances such as these are referred to as epoxy resins.

By far the most important type of epoxy resin are the bisphenol A/epichlorohydrin resins (generally referred to in short as "bis-A-resins") obtainable from so-called "bisphenol A" [=(2,2-bis-(4-hydroxyphenyl)-propane)] and epichlorohydrin in the presence of sodium hydroxide. The so-called bisphenol F/epichlorohydrin resins also play an important role.

Commercially available epoxy resins generally have a relatively low molecular weight and are converted into high molecular weight materials by chemical reaction through the addition of a so-called hardener. Accordingly, the hardener promotes crosslinking. Accordingly, it was originally proposed to refer to the epoxy resins before crosslinking as precondensates or intermediates and not as resins. However, this nomenclature has never been adopted. The expression "uncured epoxy resin" is now widely used for the as yet uncrosslinked resin while the expression "cured epoxy resin" is widely used for the crosslinked resin.

From the processing point of view, epoxy resins are classed as so-called casting resins which are understood to be liquid or fusible resins that change into a crosslinked state on their own or with reactants (e.g., hardeners) by polyaddition or polymerization. Accordingly, epoxy resins are casting resins with a sufficient number of epoxy groups for hardening. Catalyzed resins are processable mixtures of a casting resin with the necessary additives, for example hardeners, catalysts, fillers. Cured casting resins are materials of hardened catalyzed resins which are made up as moldings or semifinished products. Accordingly, the following scheme applies:

| | homogenization | |
|---|---|---|
| Epoxy resin + hardener + additives | XXXXXXXXX> | catalyzed resin |
| | hardening | |
| Catalyzed resin | XXXXXXXXX> | molding material |

A particularly important class of cured casting resins are coatings and adhesives based on epoxy resins.

Epoxy resins have a very low molecular weight compared with other high molecular weight polymers and, in some cases, are even defined low molecular weight compounds. Accordingly, the most important chemical reaction for their use as plastics or crosslinking which is generally initiated by the addition of a second component, the so-called hardener. In principle, the oxirane ring is opened and, in many cases, the free valencies are attached to other functional groups present in the epoxy resin with incorporation of the hardener. Crosslinking takes place by polyaddition or polymerization without the elimination of solid, liquid or gaseous substances, so that bubble formation is avoided, even in the absence of pressure, and very little shrinkage occurs. Numerous substances are known as hardeners from the prior art. The most important include organic dicarboxylic and polycarboxylic anhydrides, reactive diamines and polyamines or amides and mercaptans.

Nowadays, mercaptan hardeners are commercially available products, and their advantages are described, for example, in a paper published by Henkel Corporation, entitled "Mercaptans: An Added Dimension for Epoxy Coatings" (authors: Stuart J. Hartman, Raymond P. Dallago), which is a summary of a lecture delivered at a symposium on Feb. 23, 1987. Additionally, this paper shows that "Capcure®" mercaptan hardeners offer many advantages over conventional hardeners for epoxy resins.

BRIEF SUMMARY OF THE INVENTION

This invention relates to epoxy resin hardener compositions containing at least one mercaptan hardener and at least one metal salt of $C_{8-24}$ carboxylic acids.

The problem addressed by the present invention was to provide hardener compositions for epoxy resins. In the interests of simplicity, such compositions are referred to in short hereinafter as epoxy resin hardener compositions.

It has surprisingly been found that, when crosslinked with epoxy resins, epoxy resin hardener compositions containing at least one mercaptan hardener and at least one metal salt of $C_{8-24}$ carboxylic acids lead to molding compounds, more particularly coatings, which are distinguished by excellent performance properties and which, in particular, show excellent gloss.

In a first embodiment, therefore, the present invention relates to epoxy resin hardener compositions containing at least one mercaptan hardener and at least one metal salt of $C_{8-24}$ carboxylic acids.

Hardeners for epoxy resins, also known as epoxy curing agents, are well-known to the expert, cf. for example "Handbook of Coating Additives", Vol. 2, Leonard J. Calbo (editor), New York 1992, pages 277–299 where, on page 298 in particular, there is a reference to polymercaptans which count as "mercaptan hardeners" in the context of the present invention. The definition of mercaptan hardeners is otherwise well-known to the expert. Thus, a more recent dictionary defines the term as follows: "mercaptan hardeners (polysulfide hardeners)=hardeners of varying chemical structure, for example SH-terminated polysulfides, mercapto esters and mercapto ethers, for the cold hardening of epoxy resins", cf. RÖMPP, Lexikon Lacke und Druckfarben, Stuttgart 1998, page 375. In the context of the present invention, mercaptan hardeners are any organic compounds containing one or more mercapto groups which are suitable for the hardening of epoxy resins.

In one embodiment of the invention, the composition additionally contains at least one amide resin hardener and/or at least one amine resin hardener. Amide resin hardeners and amine resin hardeners are known to the expert. Information on these special hardeners can be found, for example, in the following literature: Zenko. W. Wicks/ Frank N. Jones/S. Peter Pappas; "Organic Coatings: Science and Technology, Vol. I, New York 1993 pages 162–179; "Lackharze-Chemie, Eigenschaften und Anwendungen"; Dieter Stoye und Werner Freitag (ed.); Munich 1996; pages 252–263; and H. Kittel; "Lehrbuch der Lacke und Beschichtungen; Vol. 2"; Stuttgart 1998; pages 267–291.

DETAILED DESCRIPTION OF THE INVENTION

As mentioned above, the compositions according to the invention contain at least one metal salt of $C_{8-24}$ carboxylic acids in addition to the mercaptan hardener. The salt(s) in question is/are in particular Ba, Cd, Ca, Ce, Cu, Fe, La, Pb, Mn, Zn and Zr salts of $C_{8-24}$ carboxylic acids.

Examples of suitable carboxylic acids are caprylic acid, pelargonic acid, capric acid, undecanoic acid, lauric acid, tridecanoic acid, myristic acid, pentadecanoic acid, palmitic acid, heptadecanoic acid, stearic acid, nonadecanoic acid, arachic acid, heneicosanoic acid, behenic acid, 1-undecenoic acid, lauroleic acid, myristoleic acid, palmitoleic acid, oleic acid, petroselic acid, elaidic acid, ricinoleic acid, linoleic acid, linolaidic acid, linolenic acid, elaeostearic acid, gadoleic acid, arachidonic acid, erucic acid, brassidic acid, clupanodonic acid and also naphthenic, 2-ethylhexanoic, tall oil, neodecanoic and isononanoic acid. The carboxylic acids may be present individually or in the form of mixtures.

In one preferred embodiment of the invention, the compositions contain zinc salts of $C_{8-24}$ carboxylic acids as the metal salts of carboxylic acids, zinc ricinoleate (=zinc salt of cis-12-hydroxyoctadec-9-enoic acid) being most particularly preferred. The zinc ricinoleate may be used in pure form or in technical quality. If it is of technical quality, it may contain zinc salts of other hydroxy fatty acids and other saturated and/or unsaturated fatty acids and also zinc salts of abietic acid or similar resin acids and derivatives of tocopherols or ascorbic acid in addition to the zinc salt of cis-12-hydroxyoctadec-9-enoic acid.

The mixtures according to the invention contain the metal salts of $C_{8-24}$ carboxylic acids in a quantity of, in particular, 0.01 to 5.0% by weight, based on the mercaptan hardener. A quantity of 0.5 to 3% by weight is particularly preferred.

To produce moldings, more particularly coatings, the epoxy resin hardener compositions according to the invention are reacted with epoxy resins. These epoxy resins are polyepoxides containing on average at least two epoxy groups per molecule. These epoxy compounds may be both saturated and unsaturated and aliphatic, cycloaliphatic, aromatic or heterocyclic and may also contain hydroxyl groups. In addition, they may contain substituents which do not cause any troublesome secondary reactions under the mixing and reaction conditions, for example alkyl or aryl substituents, ether groups and the like. These epoxy compounds are preferably polyglycidyl ethers based on polyhydric, preferably dihydric, alcohols, phenols, hydrogenation products of these phenols and/or of novolaks (reaction products of monohydric or polyhydric phenols with aldehydes, more particularly formaldehyde, in the presence of acidic catalysts). The epoxy equivalent weights of these epoxy compounds are preferably between 160 and 3000 and more preferably between 170 and 1000. The epoxy equivalent weight of a substance is the quantity of that substance (in grams) which contains 1 mole of oxirane rings.

Preferred polyhydric phenols are the following compounds: resorcinol, hydroquinone, 2,2-bis-(4-hydroxyphenyl)-propane (bisphenol A), isomer mixtures of dihydroxydiphenyl methane (bisphenol F), tetrabromobisphenol A, 4,4'-dihydroxydiphenyl cyclohexane, 4,4'-dihydroxy-3,3-dimethyl diphenyl propane, 4,4'-dihydroxydiphenyl, 4,4'-dihydroxybenzophenol, bis-(4-hydroxyphenyl)-1,1-ethane, bis-(4-hydroxyphenyl)-1,1-isobutane, bis-(4-hydroxyphenyl)-methane, bis-(4-hydroxyphenyl)-ether, bis-(4-hydroxyphenyl)-sulfone and the chlorination and bromination products of the compounds mentioned; bisphenol A is most particularly preferred.

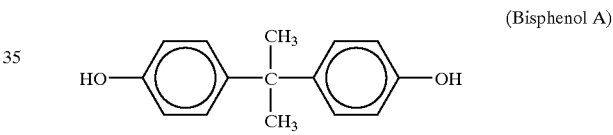

(Bisphenol A)

Polyglycidyl ethers of polyhydric alcohols are also suitable epoxy resins. Examples of such polyhydric alcohols are ethylene glycol, diethylene glycol, triethylene glycol, 1,2-propylene glycol, polyoxypropylene glycols (n=1–20), 1,3-propylene glycol, 1,4-butylene glycol, pentane-1,5-diol, hexane-1,6-diol, hexane-1,2,6-triol, glycerol and bis-(4-hydroxycyclohexyl)-2,2-propane.

Other suitable epoxy resins are polyglycidyl ethers of polycarboxylic acids which are obtained by reacting epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalene dicarboxylic acid and dimerized linolenic acid. Examples are adipic acid diglycidyl ester, phthalic acid diglycidyl ester and hexahydrophthalic acid diglycidyl ester.

Mixtures of several epoxy resins may also be used.

In another embodiment, therefore, the present invention relates to a process for the production of high-gloss epoxy resin coatings in which a component A containing at least one epoxy resin is contacted with at least one mercaptan hardener and at least one metal salt of $C_{8-24}$ carboxylic acids and, optionally after the incorporation of other additives, the resulting mixture is homogenized to form a catalyzed resin which is then cured by crosslinking.

The foregoing observations on epoxy resins apply to component A. The foregoing observations also apply to the mercaptan hardeners and to the metal salts of $C_{8-24}$ carboxylic acids.

The key feature of the process according to the invention is that the epoxy resins of component A come into contact with mercaptan hardeners and $C_{8-24}$ carboxylic acids. This may readily be achieved by initially preparing a component B containing a mixture of mercaptan hardeners and metal salts of carboxylic acids and then contacting this component B with component A. However, it may even be desired to contact the mercaptan hardener and $C_{8-24}$ acids successively, i.e. separately from one another, with component A.

In one embodiment, the epoxy resins are cured in the additional presence of amine and/or amide hardeners. The foregoing observations on amide resin hardeners and amine resin hardeners apply to these special hardeners.

Although the temperature prevailing in the process according to the invention is not critical, the curing step is preferably carried out at a temperature of −10 to 200° C. and more preferably at a temperature of 5 to 50° C.

The mercaptan hardeners and the carboxylic acid salts are used in relatively small quantities, based on the epoxy resins of component A. The mixture ratios in the catalyzed resin are preferably adjusted so that the sum total of mercaptan hardeners and metal salts of $C_{8-24}$ carboxylic acids is between 0.5 and 200% by weight and preferably between 1 and 25% by weight, based on the sum total of epoxy resins.

The additives may be selected from any of the relevant additives known to the expert. It does not matter whether the additives are made up with the epoxy resins and/or the mercaptan hardeners and/or the carboxylic acid salts.

Typical additives are solvents, pigments, fillers and other auxiliaries such as, for example, defoamers, deaearators, wetting agents, dispersants, surface additives, flatting agents, flow additives, corrosion inhibitors, light stabilizers, drying agents, catalysts, biocides.

The present invention also relates to the use of compositions containing at least one mercaptan hardener and at least one metal salt of $C_{8-24}$ carboxylic acids as hardeners for epoxy resins. The foregoing observations apply to the mixtures containing at least one mercaptan hardener and at least one metal salt of $C_{8-24}$ carboxylic acids.

The present invention will now be illustrated in more detail by reference to the following specific, non-limiting examples.

EXAMPLES

1. Substances Used
Resin Components
HK-1–Chemres E 50×75: commercially available epoxy resin (Henkel SpA, Italy)
HK-2=Rilanit Special micro: hydrogenated castor oil (Henkel KGaA, Germany)
HK-3=Perenol F 40: polyacrylate-based flow controller (Henkel KGaA, Germany)
HK-4=Texaphor 963: pigment dispersant (Henkel KGaA, Germany)
Hardener Components:
CK-1=Versamide 115×70: commercially available polyamide hardener (Henkel, Germany)
CK-2=Capcure WR-6: commercially available mercaptan hardener (Henkel Corporation, USA)
CK-3=Capcure 1.5 HV: commercially available mercaptan hardener (Henkel Corporation, USA)
CK-4=Zinc ricinoleate
Solvents:
Xylene: isomer mixture (commercially available mixture)
MIBK: methyl isobutyl ketone
Pigment:
Titanium dioxide: commercially available $TiO_2$ of the rutile type (pigment)

2. Examples and Comparison Examples

The formulations and the results of comparison tests C-1 and C-2 and tests B-1a, B-1b, B-2a and B-2b according to the invention are set out in Table 1. The figures in the Table (apart from the last column) represent parts by weight. The gloss values (last line of Table 1) are 60° reflectometer values according to DIN 67530.

Test Procedure

The components HK-1, titanium dioxide, HK-2, n-butanol, HK-3, HK-4 and xylene were homogeneously stirred together at a temperature of 23° C. The resulting mixture is called "mixture A".

In addition, the components CK-1, CK-2, CK-3, MIBK, xylene and CK-4 were homogeneously stirred together at a temperature of 23° C. The resulting mixture is called "mixture B".

Mixtures A and B were combined and homogenized to form a catalyzed resin. This resin was applied directly, i.e. with no further induction period, by air-pressure spraying in a layer thickness of 60 micrometers and was left to harden by crosslinking for 7 days at a temperature of 23° C.

After curing, the gloss of the coating obtained (cf. last line of the Table) was determined as a dimensionless number by reflectometer measurement at an angle of 60° to DIN 67530.

It can clearly be seen from Table 1 that the coating compositions of the Examples according to the invention are distinguished by far higher gloss values than the coating compositions according to the Comparison Examples.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

TABLE 1

| Component | C-1 | B-1a | B-1b | C-2 | B-2a | B-2b |
| --- | --- | --- | --- | --- | --- | --- |
| HK-1 | 285.48 | 285.48 | 285.48 | 282.96 | 282.96 | 282.96 |
| Titanium dioxide | 289.98 | 289.98 | 289.98 | 287.56 | 287.56 | 287.56 |
| HK-2 | 10.00 | 10.00 | 10.00 | 10.00 | 10.00 | 10.00 |
| n-Butanol | 2.36 | 2.36 | 2.36 | 2.36 | 2.36 | 2.36 |
| HK-3 | 11.39 | 11.39 | 11.39 | 11.22 | 11.22 | 11.22 |
| HK-4 | 5.00 | 5.00 | 5.00 | 5.00 | 5.00 | 5.00 |
| Xylene | 89.83 | 89.83 | 89.83 | 89.03 | 89.03 | 890.3 |
| CK-1 | 135.20 | 135.20 | 135.20 | 135.53 | 135.53 | 135.53 |
| CK-2 | 15.56 | 15.56 | 15.56 | — | — | — |
| CK-3 | — | — | — | 19.80 | 19.80 | 19.80 |
| MIBK | 135.21 | 135.21 | 135.21 | 135.00 | 135.00 | 135.00 |
| Xylene | 46.18 | 46.18 | 46.18 | 46.33 | 46.33 | 46.33 |
| CK-4 | — | 1.7 | 3.4 | — | 1.7 | 3.4 |
| Gloss*) | 85 | 91 | 91 | 85 | 88 | 88 |

*)Determined by reflectometer measurement at an angle of 60° to DIN 67530 after curing of the catalyzed resin

What is claimed is:

1. A method of hardening an epoxy resin comprising combining a composition comprising at least one mercaptan hardener and at least one metal salt of ricinoleic acid with an epoxy resin.

2. The method according to claim 1, wherein the composition further comprises at least one amide resin hardener.

3. The method according to claim 2, wherein the at least one metal salt of a carboxylic acid comprises zinc ricinoleate.

4. The method according to claim 1, wherein the composition further comprises at least one amine resin hardener.

5. The method according to claim 4, wherein the at least one metal salt of a carboxylic acid comprises zinc ricinoleate.

6. The method according to claim 1, wherein the at least one metal salt of a carboxylic acid comprises zinc ricinoleate.

7. The method according to claim 1, wherein the at least one metal salt is present in an amount of from 0.01 to 5% by weight, based on the at least one mercaptan hardener.

8. A process for producing a high-gloss epoxy resin coating, said process comprising combining a component (A) comprising at least one epoxy resin and a component (B) comprising at least one mercaptan hardener and at least one metal salt of ricinoleic acid, homogenizing the combination of component (A) and component (B) to form a catalyzed resin, and allowing said resin to cure.

9. The process according to claim 8, wherein said catalyzed resin is cured at a temperature of from about 50° C. to about 50° C.

10. The process according to claim 9, wherein said catalyzed resin is cured in the presence of one or more additives selected from the group consisting of amine resin hardeners and amide resin hardeners.

11. The process according to claim 10, wherein the at least one metal salt of a carboxylic acid comprises zinc ricinoleate.

12. The process according to claim 9, wherein the at least one metal salt of a carboxylic acid comprises zinc ricinoleate.

13. The process according to claim 8, wherein said catalyzed resin is cured in the presence of one or more additives selected from the group consisting of amine resin hardeners and amide resin hardeners.

14. The process according to claim 13, wherein the at least one metal salt of a carboxylic acid comprises zinc ricinoleate.

15. The process according to claim 8, wherein the at least one metal salt of a carboxylic acid comprises zinc ricinoleate.

16. The process according to claim 8, wherein the at least one metal salt is present in component (B) in amount of from 0.01 to 5% by weight, based on the at least one mercaptan hardener.

17. An epoxy resin hardener composition comprising at least one mercaptan hardener and zinc ricinoleate.

18. The composition according to claim 17, further comprising at least one amide resin hardener.

19. The composition according to claim 17, further comprising at least one amine resin hardener.

20. The epoxy resin hardener composition according to claim 17, wherein the zinc ricinoleate is present in an amount of from 0.01 to 5% by weight, based on the at least one mercaptan hardener.

* * * * *